US009798301B2

(12) United States Patent
Feigenbaum et al.

(10) Patent No.: US 9,798,301 B2
(45) Date of Patent: Oct. 24, 2017

(54) AUTOMATICALLY MANAGING THE ENVIRONMENT OF A PHYSICAL ZONE

(71) Applicant: International Business Machines Corporation, Armonk, NY (US)

(72) Inventors: Barry A. Feigenbaum, Austin, TX (US); Sueann Nichols, Lantana, FL (US); Holly H. Nielsen, San Jose, CA (US); Elizabeth V. Woodward, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 1186 days.

(21) Appl. No.: 13/691,816

(22) Filed: Dec. 2, 2012

(65) Prior Publication Data
US 2014/0156103 A1   Jun. 5, 2014

(51) Int. Cl.
G05D 1/02 (2006.01)
G05D 1/10 (2006.01)
G05B 15/02 (2006.01)

(52) U.S. Cl.
CPC .... G05B 15/02 (2013.01); *G05B 2219/25084* (2013.01)

(58) Field of Classification Search
CPC ......... F24F 11/02; G05B 15/02; G05B 15/00; G06F 3/00; G06F 3/048; G06F 7/04; G06F 9/02; G06F 9/24; G06F 15/16; G06F 15/18; G06F 17/30; G06F 17/50; G06F 17/60; G06F 19/00; G06K 7/00; H04W 64/00; H04M 3/42; H04N 7/91; H04N 7/025; H04N 7/173; H04Q 7/00

USPC .......... 701/1; 702/2, 24; 715/206, 706; 725/24, 34; 726/2, 3; 455/415, 456
See application file for complete search history.

(56) References Cited

U.S. PATENT DOCUMENTS

| 5,762,265 | A | 6/1998 | Kitamura et al. ............. 236/51 |
| 6,498,955 | B1 | 12/2002 | McCarthy et al. ............. 700/1 |
| 7,216,002 | B1 | 5/2007 | Anderson ..................... 700/1 |
| 7,747,246 | B2 | 6/2010 | Zellner et al. ............. 455/415 |
| 7,876,215 | B1* | 1/2011 | Brady, Jr. ................ 340/539.11 |
| 2003/0236625 | A1* | 12/2003 | Brown et al. ................ 702/2 |

(Continued)

FOREIGN PATENT DOCUMENTS

JP  2011075138 A  4/2011  ............. F24F 11/02

OTHER PUBLICATIONS

O'Hara et al., "Jukola: Democratic Music Choice in a Public Space," ACM, DIS '04, 2004.

(Continued)

*Primary Examiner* — Mohammad Ali
*Assistant Examiner* — Md Azad
(74) *Attorney, Agent, or Firm* — Ido Tuchman; Mercedes L. Hobson (57) ABSTRACT

A system, method, and computer program product for automatically managing an environment for a physical zone over a period of time. Position coordinates are received from a plurality of entities. It is determined which of the entities will occupy the physical zone over a time frame, the physical zone including at least one environmental characteristic. Environmental preferences are accessed for the entities determined to occupy the physical zone for the time frame. The environmental characteristic of the physical zone is adjusted for the time frame based on the accessed environmental preferences for the entities.

24 Claims, 11 Drawing Sheets

(56) References Cited

U.S. PATENT DOCUMENTS

2006/0089727 A1* 4/2006 Drouet et al. .................. 700/17
2009/0031336 A1  1/2009 Chavez et al. ................. 725/24
2011/0197224 A1  8/2011 Meijer ............................ 725/34
2013/0024465 A1* 1/2013 Schiff et al. .................. 707/749

OTHER PUBLICATIONS

Chao et al., "Adaptive Radio: Achieving Consensus using Negative Preferences," ACM, Group'05, Nov. 6-9, 2005, 4 pages.
Vazquez et al., "A Passive Influence Model for Adapting Environments based on Semantic Preferences," 2006.

* cited by examiner

AUTOMATICALLY MANAGING THE ENVIRONMENT OF A PHYSICAL ZONE

BACKGROUND

The invention relates to automatically managing an environment in an environmental zone based on preferences for entities. The current inability of businesses to frequently adapt their environment in response to the immediate preferences and needs of the current customers within an environment leads to less optimal environmental conditions. As an example, outdoor malls purchase music to be played through their sound system to create a comfortable environment where customers will want to stay and continue to shop. However, the playlists do not necessarily represent the likes and music preferences of the shoppers passing near the speakers at any given time. Another example of an environmental characteristic includes temperature. Some customers may prefer the temperature to be warmer than other customers.

The ability to adapt to individuals' preferences is important to businesses that are looking for ways to create a personalized experience for their customers. A number of industries have indicated that they are increasingly focused on delivering a personal experience based on the customer's preferences in order to win new customers and retain existing customers.

BRIEF SUMMARY

Accordingly, one example of the present invention is a method for automatically managing an environment for a physical zone over a period of time. The physical zone includes at least one environmental characteristic. The method includes a receiving step for receiving position coordinates from a plurality of entities. A determining step determines which of the entities will occupy the physical zone over a time frame. An accessing step accesses environmental preferences for the entities determined to occupy the physical zone for the time frame. An adjusting step adjusts the environmental characteristic of the physical zone for the time frame based on the accessed environmental preferences for the entities.

Another example of the present invention is a system for automatically managing an environment for a physical zone over a period of time. The system includes a computer that further includes a processor. The computer is configured to receive position coordinates from a plurality of entities. The computer is further configured to determine which of the entities will occupy the physical zone over a time frame, with the physical zone including at least one environmental characteristic. The computer is also configured to access environmental preferences for the entities determined to occupy the physical zone for the time frame. The computer is additionally configured to adjust the environmental characteristic of the physical zone for the time frame based on the accessed environmental preferences for the entities.

Yet another embodiment of the invention is a computer program product embodied in a tangible media. The computer program product includes computer readable program codes configured to cause a program to: receive position coordinates from a plurality of entities; determine which of the entities will occupy the physical zone over a time frame; access environmental preferences for the entities determined to occupy the physical zone for the time frame; and adjust the environmental characteristic of the physical zone for the time frame based on the accessed environmental preferences for the entities.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION

The present invention is described with reference to embodiments of the invention. Throughout the description of the invention reference is made to FIGS. 1-11. When referring to the figures, like structures and elements shown throughout are indicated with like reference numerals.

An embodiment of the invention describes a mechanism for a velocity-based passive group voting system for control of environmental zone characteristics. Environmental characteristics, such as sound, lighting, temperature, air current, humidity language and others, are managed in an area divided into one or more environmental zones. In an example, the one or more environmental zones comprise of one or more physical zones. The environmental zones include entities, where each entity has a set of preferences associated with it. By way of example, the entities may have representation within a social network.

In an embodiment, a mechanism allows an administrator of an environmental zone to access the preferences of the entities associated with the environmental characteristics. The mechanism may predict the future collective vote of participants based on calculating current location, movement, and preferences associated with the entities that are migrating towards or are within a given environmental zone.

The mechanism may additionally update the environmental control for an environmental zone based on the results of passive voting.

In an embodiment, entities transmit their location and, optionally, direction and speed. Entitles may comprise of people, groups of people, vehicles, mobile devices, animals, or other entities. By way of example, entities identify who they are to the system. In an embodiment, direction and speed can be determined via global positioning satellite (GPS) location, a mobile device signal, social media information, a radio-frequency identification (RFID) signal or other methods. Social media information may include an entity checking in at a location using a social media application like FourSquare.

In an embodiment, the system compiles preference votes for an environmental characteristic based on the known preferences of the entities within the environmental zone. Preferences can be derived from a variety of sources, including the following: a preferences profile created for the entity to describe their preferences for environmental characteristics; a predicted preference based on information for the entity, such as analyzing content available on the web, in databases, in electronic media, or in other sources; social media information pages or subscriptions for the entity. Based on the passive votes for the entities within the environmental zone, the characteristics of the environmental zone are adjusted by environmental zone controllers.

Examples of environmental zone controllers could be speaker systems where each speaker can play a selection from a set of songs, scented sprayers with a selection of scents, lighting systems that can change the color displayed, music playlists that can prioritize the list of songs, temperature controllers that can increase or reduce temperature, tickers that can move more quickly or slowly, rotating fans that change air current, or announcement systems with multi-lingual or translation capabilities. In an embodiment, based on the velocity of entities, the characteristics of environmental zones are modified to accommodate the predicted results of a passive vote of entities that will occupy the environmental zones.

For example, a system processor sends a signal to a servo motor which adjusts a potentiometer coupled to a volume control circuit in order to adjust the volume of the audio in an environmental zone. In another example, a system processor sends a signal to a servo motor which adjusts a potentiometer coupled to a lighting control circuit in order to adjust the lighting in an environmental zone. In another example, a system processor sends a signal to a thermostat in order to adjust the temperature in an environmental zone.

Figure 1:
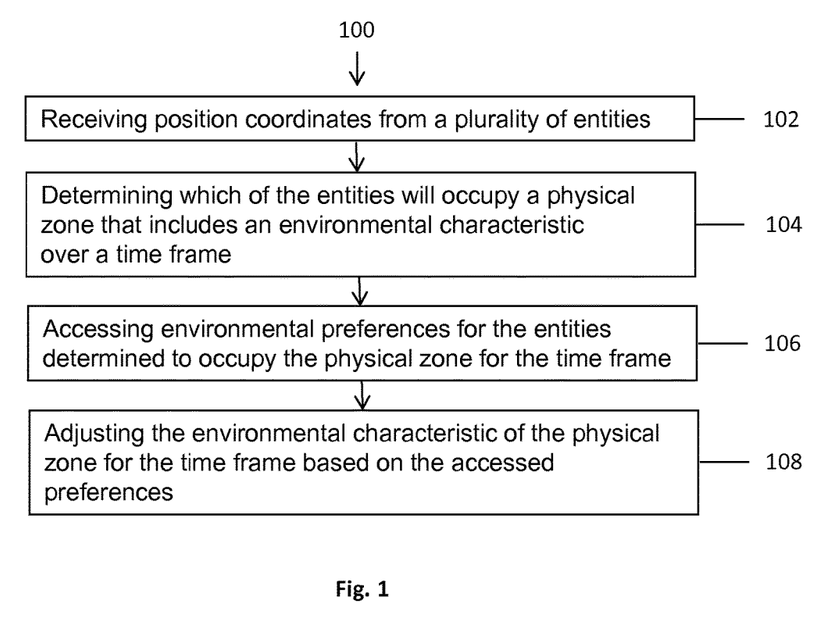
FIG. 1 shows a method for automatically managing an environment for a physical zone over a period of time according to one embodiment of the present invention.

FIG. 1 shows a method for automatically managing an environment for a physical zone over a period of time according to one embodiment of the present invention. The method includes a receiving step 102. During the receiving step 102, position coordinates are received from a plurality of entities. By way of example, the entities comprise any of people, groups of people, vehicles, mobile devices and animals. In an example, the position coordinates can be detected based on any of a global positioning satellite (GPS) location, a mobile device signal, social media information, and a radio-frequency identification (RFID) signal. After the receiving step 102 is completed, the method continues to determining step 104.

At determining step 104, it is determined which of the entities will occupy a physical zone over a time frame. The physical zone includes at least one environmental characteristic. By way of example, the environmental characteristic can be any of temperature, lighting, music type, audio volume, scent, air current, humidity and language requirements. After the determining step 104 is completed, the method continues to accessing step 106. At accessing step 106, environmental preferences for the entities determined to occupy the physical zone over the time frame are accessed. By way of example, the accessed environmental preferences for a first entity are mined from one or more of a social media profile, a profile describing the first entity's environmental preferences, web content associated with the first entity, and trends based the first entity's demographic information. After the accessing step 106 is completed, the method continues to adjusting step 108. At adjusting step 108, the environmental characteristic of the physical zone is adjusted for the time frame based on the accessed environmental preferences.

Figure 2:
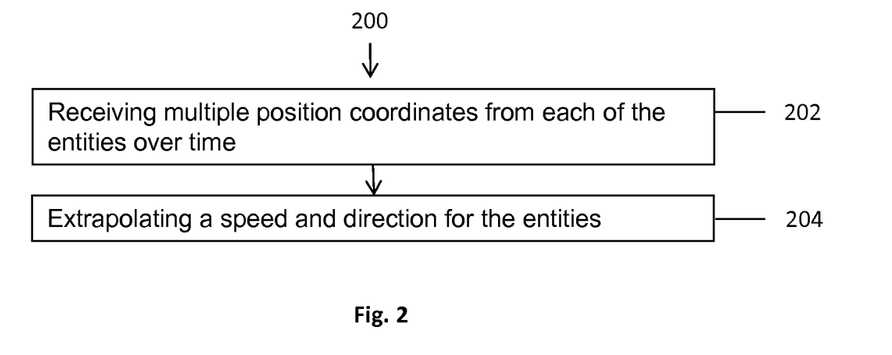
FIG. 2 shows a method for determining which of the entities will occupy a physical zone over a time frame according to one embodiment of the present invention.

FIG. 2 shows a method for determining which of the entities will occupy the physical zone over the time frame according to one embodiment of the present invention. The method of FIG. 2 may be implemented in connection with the method of FIG. 1. For example, receiving step 102 of FIG. 1 may further comprise receiving step 202 of FIG. 2. At receiving step 202, multiple position coordinates are received from each of the entities over time. In an example, determining step 104 of FIG. 1 may further comprise extrapolating step 204 of FIG. 2. At extrapolating step 204, a speed and direction is extrapolated for each of the entities.

By way of example, the speed and direction for an entity are extrapolated based on the multiple position coordinates received over time for that entity. In an embodiment, a first received position coordinate may indicate the entity was at a first position at a first time and a second received position coordinate may indicate that the entity was at a second position at a second time. The first position and second position are compared against each other to determine a change in position for the entity. A direction is extrapolated from the change in position for the entity. Then, the first time and second time are compared against each other to determine a change in time. The change in position is divided by the change in time in order to extrapolate a speed for the entity. In an embodiment, the extrapolated speed and direction for the entities is used to determine which entities will occupy a physical space over a time frame.

Figure 3:
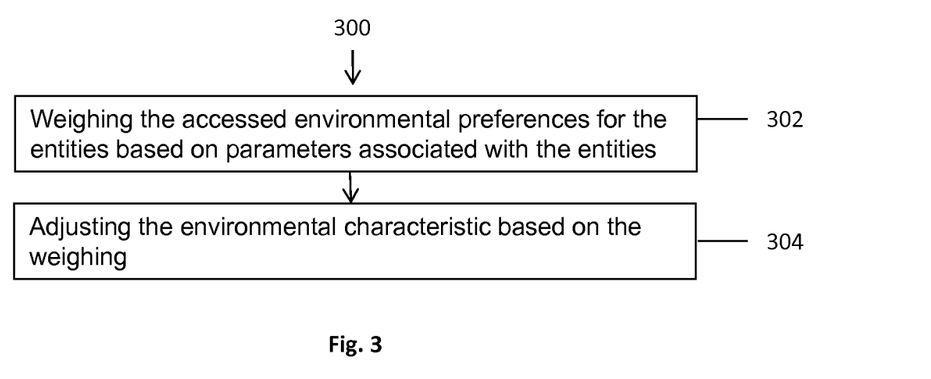
FIG. 3 shows a method for adjusting an environmental characteristic for a time frame according to one embodiment of the present invention.

FIG. 3 shows a method for adjusting an environmental characteristic for a time frame according to one embodiment of the present invention. The method of FIG. 3 may be implemented in connection with the methods of FIG. 1. For example, adjusting step 106 may further comprise the method steps of FIG. 3.

At weighing step 302, accessed environmental preferences of the entities are weighed based on parameters associated with the entities. After weighing step 302 is completed, the method continues to adjusting step 304. At adjusting step 304, en environmental characteristic is adjusted based on the weighing.

Figure 4:
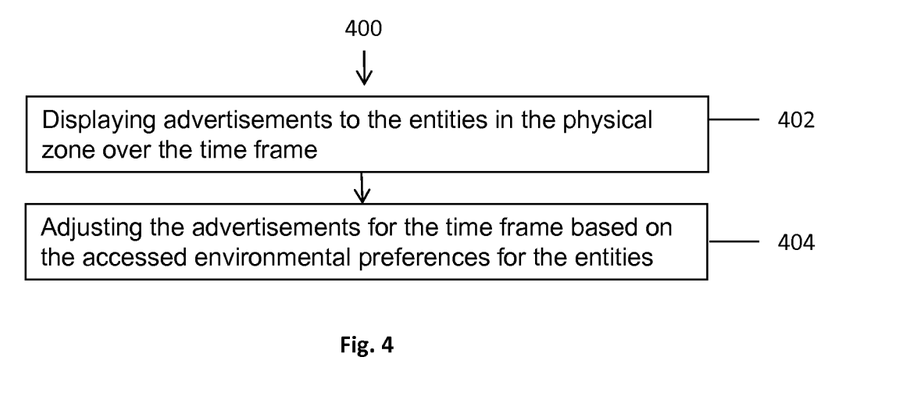
FIG. 4 shows a method for displaying advertisements in a physical zone according to one embodiment of the present invention.

FIG. 4 shows a method for displaying advertisements in a physical zone in accordance with an embodiment of the invention. The method of FIG. 4 may be implemented in connection with the method steps of FIG. 1.

The method of FIG. 4 includes a displaying step 402. At displaying step 402, advertisements are displayed to entities in the physical zone over a time frame. After the displaying step 402 is completed, the method continues to adjusting step 404. At adjusting step 404, the advertisements are adjusted for the time frame based on accessed environmental preferences for the entities. By way of example, the accessed preferences may comprise the preferences accessed in accessing step 106 of FIG. 1.

Figure 5:
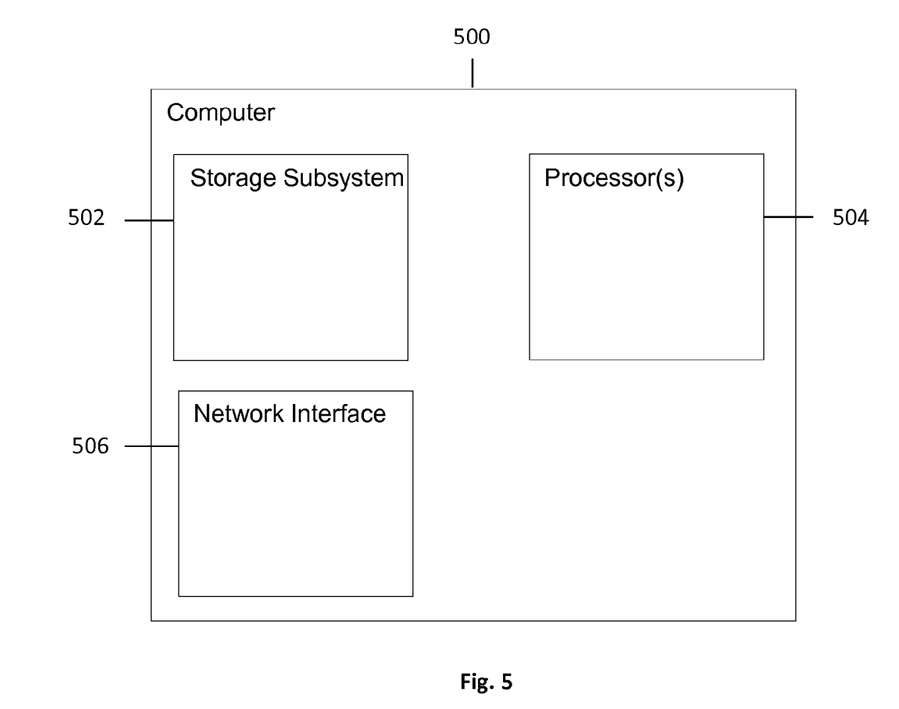
FIG. 5 shows a computer for automatically managing an environment for a physical zone over a period of time according to one embodiment of the present invention.

FIG. 5 shows a computer 500 for automatically managing an environment for a physical zone over a period of time according to one embodiment of the present invention. For example, computer 500 of FIG. 5 may be used to implement the method steps of FIGS. 1-4. Computer 500 includes storage subsystem 502, processor(s) 504, and network interface 506.

Storage subsystem 502 included in computer 500 may comprise of a hard disk, a random access memory (RAM), a read-only memory (ROM), an erasable programmable read-only memory (EPROM or Flash memory), or any other suitable storage device or combinations thereof. Processor(s) 504 included in computer 500 may comprise of one or more computer processors.

Figure 6:
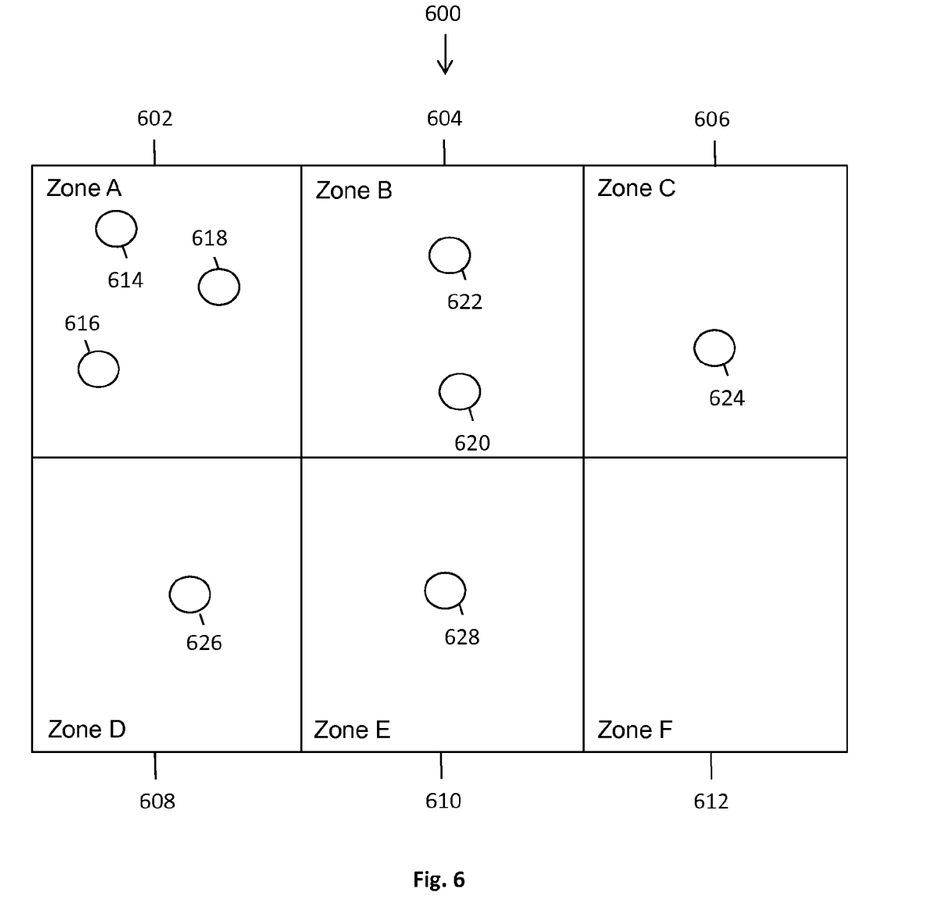
FIG. 6 shows a grid of physical zones with entities according to one embodiment of the present invention.
Figure 7:
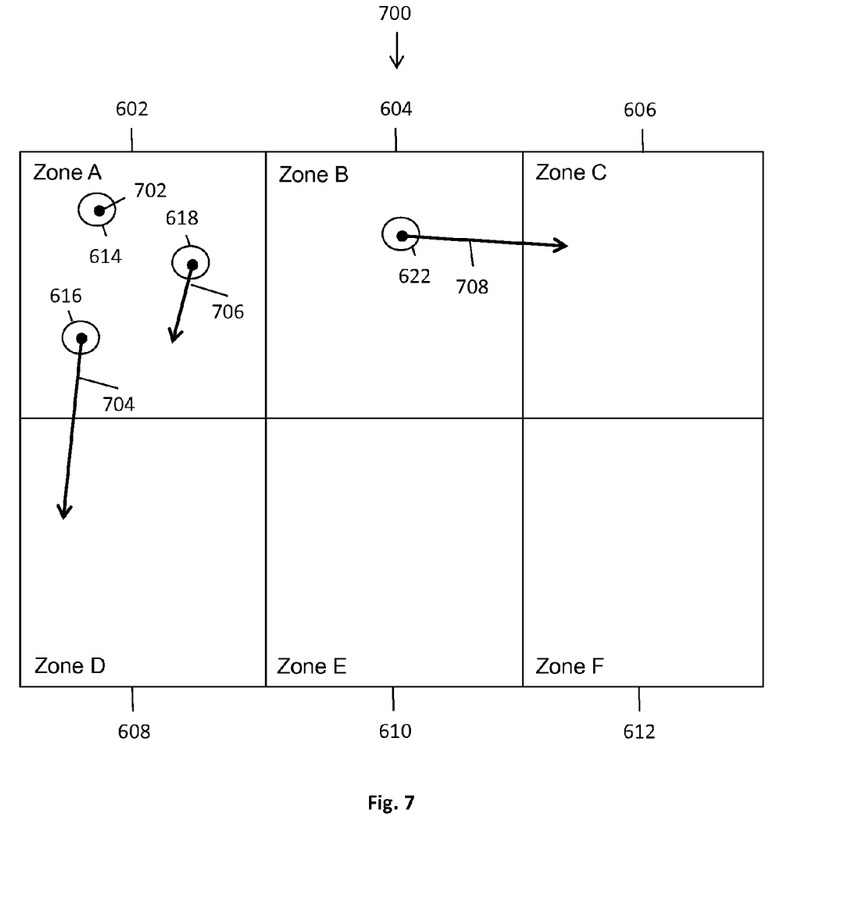
FIG. 7 shows a grid of physical zones with entities and movement vectors according to one embodiment of the present invention.
Figure 8:
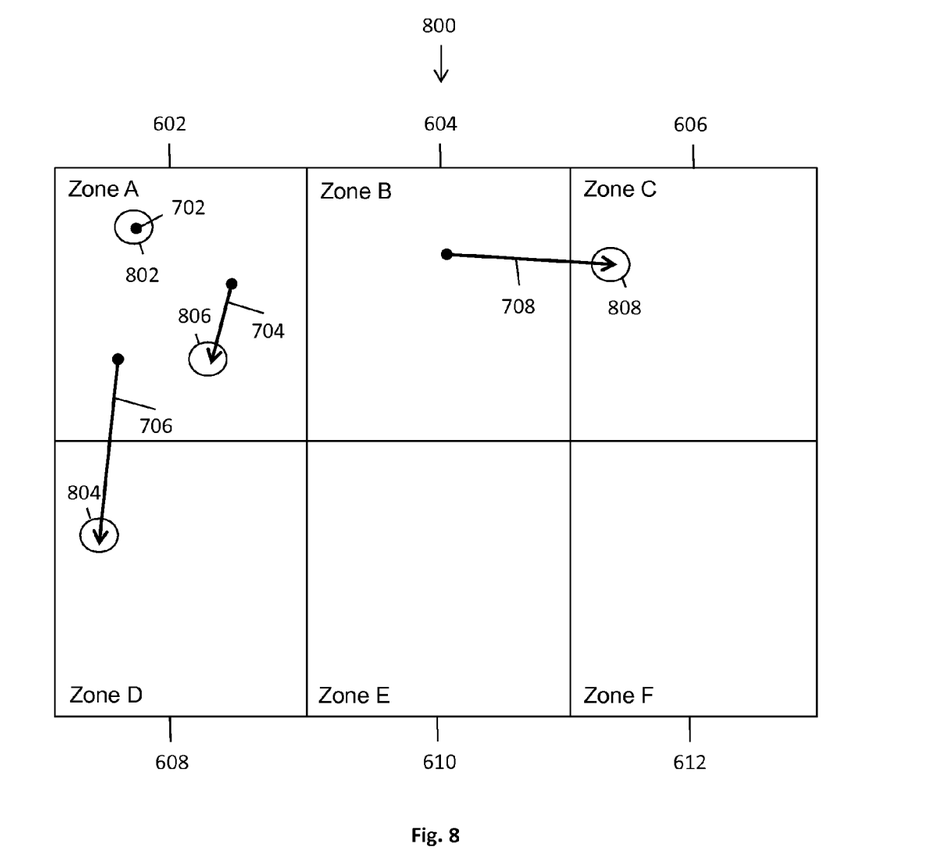
FIG. 8 shows a grid of physical zones with entity movement according to one embodiment of the present invention.

FIGS. 6-8 show physical zones according to embodiments of the invention. FIG. 6 shows a grid 600 of physical zones 602, 604, 606, 608, 610, and 612, and entities 614, 616, 618, 620, 622, 624, 626, and 628. FIG. 7 shows a grid 700 that includes velocity vector 702 for entity 614, velocity vector 704 for entity 616, velocity vector 706 for entity 618, and velocity vector 708 for entity 622. FIG. 8 shows grid 800 that includes projected entities 802, 804, 806, and 808.

Figure 9:
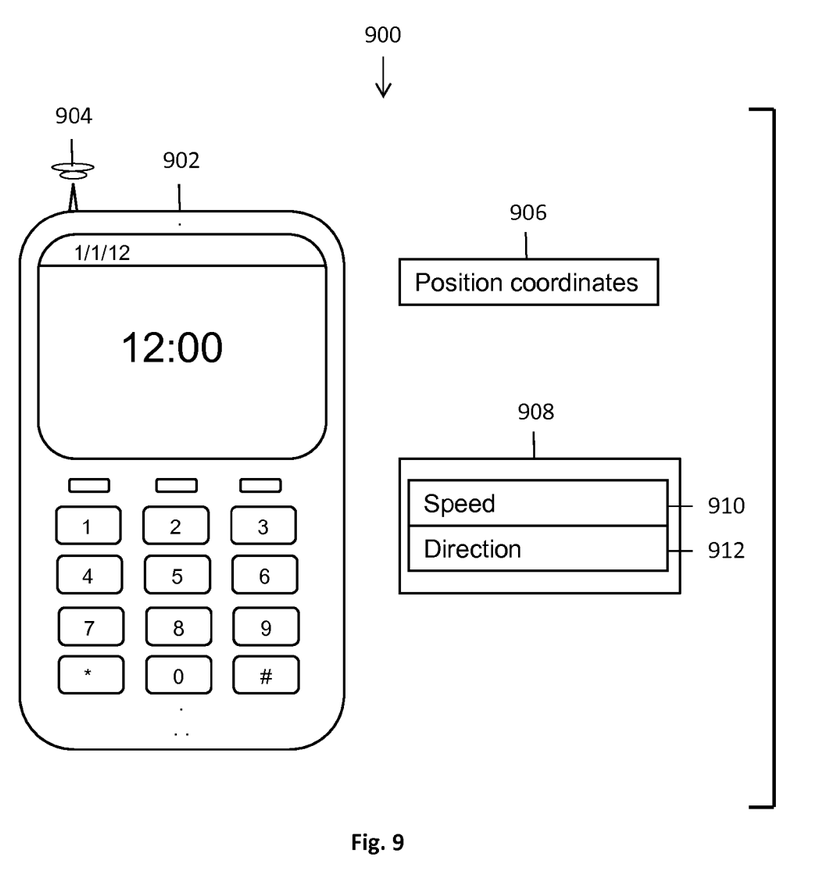
FIG. 9 shows a mobile device and position information according to one embodiment of the present invention.

FIG. 9 shows a mobile device and position information in accordance with an embodiment of the invention. System 900 of FIG. 9 includes mobile device 902, signal 904, position coordinates 906, speed information 910, and direction information 912.

Figure 10:
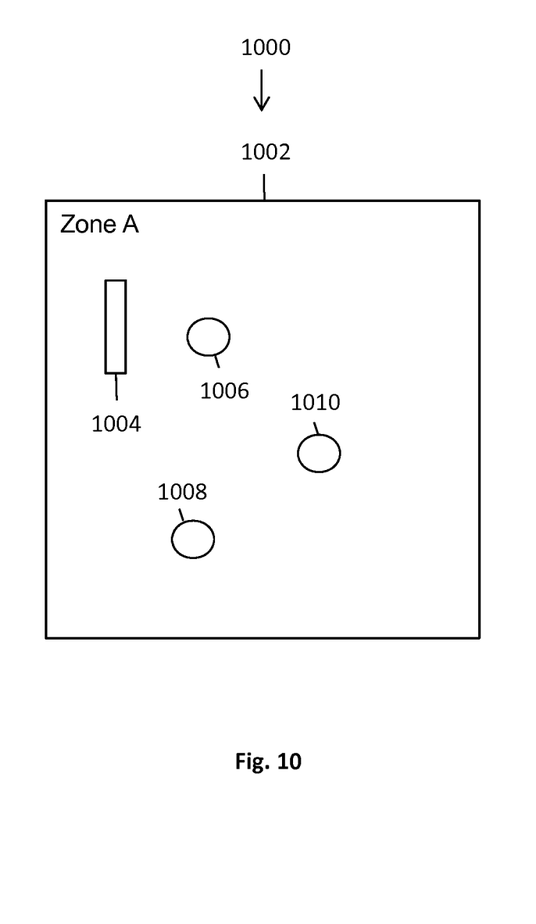
FIG. 10 shows a physical zone with advertising according to one embodiment of the present invention.

FIG. 10 shows a physical zone with advertising in accordance with an embodiment of the invention. FIG. 10 shows a grid 1000 of physical zone 1002, entities 1006, 1008, and 1010, and advertisement 1004.

Figure 11:
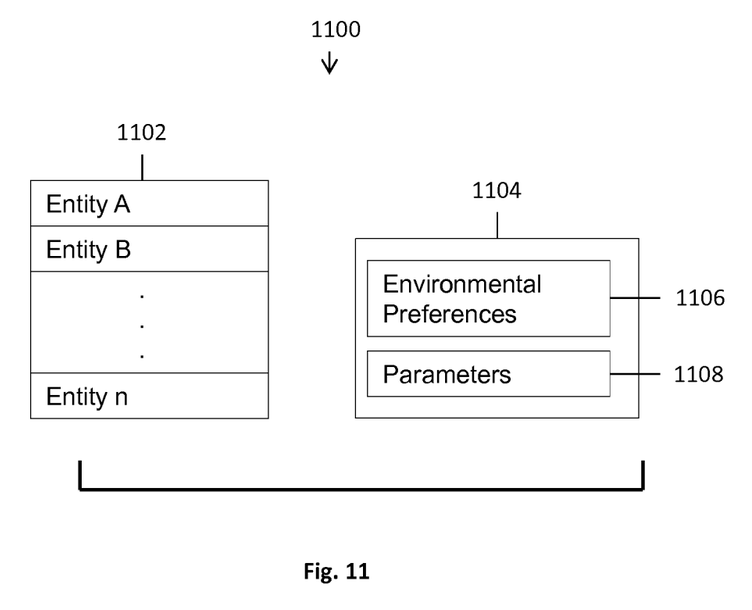
FIG. 11 shows entity profile information according to one embodiment of the present invention.

FIG. 11 shows entity profile information in accordance with an embodiment of the invention. FIG. 11 shows system 1100 that includes entity structure 1102, profile 1104, environmental preferences 1106, and parameters 1108.

In an embodiment, the computer 500 of FIG. 5, the grids of FIGS. 6-8, and the systems of FIGS. 9-11 are used in combination. By way of example, the figures may be used in any configuration suitable to operate the invention.

In an embodiment, computer 500 receives position coordinates 906 from a plurality of entities. For example, each of the entities 614, 616, 618, 620, 622, 624, 626, and 628 may send position coordinates 906 to computer 500. Computer 500 then determines which of the entities will occupy a physical zone over a time frame. For example, server 500 determines which of entities 614, 616, 618, 620, 622, 624, 626, and 628 will occupy physical zone 602 over a time frame. Physical zones 602, 604, 606, 608, 610, and 612 include one or more environmental characteristics.

In an embodiment, computer 500 then accesses environmental preferences 1106 for the entities determined to occupy the physical zone for the time frame. For example, if an entity is determined to occupy physical zone 602, computer 500 accesses data structure 1102 and further accesses environmental preferences information 1106. By way of example, data structure 1102 includes profile information for the plurality of entities. Data structure 1102 includes profile 1104 associated with an entity, which further includes environmental preferences information 1106.

In an embodiment, computer 500 then adjusts an environmental characteristic of the physical zone for the time frame based on the accessed environmental preferences. For example, computer 500 adjusts an environmental characteristic of physical zone 602 based on the accessed environmental preferences information 1106.

In an embodiment, computer 500 receives position coordinates 906 from each of the entities 614, 616, 618, 620, 622, 624, 626, and 628. Computer 500 then determines that entities 614, 616, and 618 will occupy physical zone 602 over a time frame. Then computer 500 accesses environmental preferences information 1106 from data structure 1102 for each of the entities 614, 616, and 618. After accessing environmental preferences 1106 for entities 614, 616, and 618, computer 500 adjusts an environmental characteristic of physical zone 602 based on the accessed environmental preference information.

In an embodiment, computer 500 weighs the accessed environmental preferences information 1106 for entities 614, 616, and 618 based on one or more parameters associated with the entities. By way of example, data structure 1102 includes profile information for the plurality of entities. For example, data structure 1102 includes profile 1104 associated with an entity, which further includes parameter information 1108. Parameter information 1108 associated with an entity may include, for example, spending history, spending potential, past behavior, entity size, language preference, and duration of time spent in the physical zone during the time frame for that entity.

In an embodiment, computer 500 weighs the accessed environmental preferences information 1106 for entities 614, 616, and 618 based on parameter information 1108 associated with each of the entities 614, 616, and 618. For example, parameter information 1008 associated with entity 614 may indicate that entity 614 has a higher spending potential than do entities 616 and 618. Accordingly, computer 500 may place a greater weight on environmental preferences information 1106 for entity 616. In an embodiment, computer 500 adjusts an environmental characteristic of physical zone 602 based on the weighing.

In an embodiment, computer 500 receives multiple position coordinates 906 from each of the entities over time. By way of an example, computer 500 receives multiple position coordinates 906 from entities 614, 616, 618, and 622 over time.

In an embodiment, computer 500 determines which of the entities 614, 616, 618, and 622 will occupy physical zone 602 over a time frame using the multiple position coordinates 906 received from each of the entities. By way of example, computer 500 extrapolates velocity vector 702 for entity 614, velocity vector 704 for entity 616, velocity vector 706 for entity 618, and velocity vector 708 for entity 622. The velocity vectors may be extrapolated based on the multiple position coordinates 906 received from each of the entities. A velocity vector comprises of speed 910 and direction 912 for the entity associated with the vector.

In an embodiment, computer 500 uses the extrapolated velocity vectors 702, 704, 706, and 708 to determine which of the entities 614, 616, 618, and 622 will occupy physical zone 602 over the time frame. By way of example, the time frame may be a fixed period of time in the future. Computer 500 may use the velocity vectors for each of the entities to predict where the entities will be over the time frame.

In an embodiment, computer 500 predicts that entity 614 will be at the location indicated by predicted entity 802 over the time frame based on velocity vector 702. Since the velocity vector 702 shows no speed, entity 614 is determined to have not moved. Accordingly, computer 500 determines that entity 614 will occupy the physical zone 602 over the time frame.

The computer 500 further predicts that entity 616 will be at the location indicated by predicted entity 804 over the time frame based on velocity vector 704. Accordingly, it is predicted that entity 616 will occupy physical zone 608 rather than physical zone 602 over the time frame.

The computer 500 further predicts that entity 616 will be at the location indicated by predicted entity 806 over the time frame based on the velocity vector 706. Accordingly, it is predicted that entity 616 will occupy physical zone 602 over the time frame.

The computer 500 further predicts predict that entity 622 will be at the location indicated by predicted entity 808 over the time frame based on velocity vector 708. Accordingly, it is predicted that entity 616 will occupy physical zone 606 rather than physical zone 602 over the time frame.

Accordingly, computer 500 determines that entities 614 and 616 will occupy the physical zone 602 over the time frame. In an embodiment, computer 500 then accesses environmental preferences information 1106 from data structure 1102 for each of the entities 614 and 616. After accessing environmental preferences 1106 for entities 614 and 616, computer 500 adjusts an environmental characteristic of physical zone 602 based on the accessed environmental preference information.

In an embodiment, computer 500 receives position coordinates 906 from each of the entities 1006, 1008, and 1010. Computer 500 then determines that entities 1006, 1008, and 1010 will occupy physical zone 1002 over a time frame. After the determining, computer 500 accesses environmental preferences information 1106 from data structure 1102 for each of the entities 1006, 1008, and 1010. Then computer 500 adjusts an environmental characteristic of physical zone 1002 for the time frame based on the accessed environmental preferences 1106 for entities 1006, 1008, and 1010.

In an embodiment, computer 500 also displays advertisement 1004 to entities 1006, 1008, and 1010 in physical zone 1002. Computer 500 further adjusts advertisement 1004 for the time frame based on the accessed environmental preferences 1106 for entities 1006, 1008, and 1010. By way of example, the adjustments to advertisement 1004 may include adjusting images, text size, subject matter, language, or discounts for the advertisements.

The following describes an example implementation of the invention. In an outdoor mall area, there are speakers set at different zones. Each speaker is connected to a sound system that is programmed with the music that is to be played through that speaker. Typically, the same music is played throughout or, as one moves from one speaker zone to another, the music being played by each speaker or groups of speakers is different. For example, there may be different playlists based on the expected or targeted shopper demographics. With this implementation, the music played through the speaker would instead be the result of passive voting by the people currently in the area and a prediction of the preference of the group of people likely to be in the area or moving into the area as the next song is played.

In an embodiment, entities authenticate with a system and establish their location through GPS. The system analyzes their preferences for music styles, artists, and songs. For example, if the business has access to the entities' preference information on facebook or other social networking sites, the system analyzes this. The system may also access the entities' music preferences through facebook analytics. The entities may optionally share their playlist from an online music service with the system. Also, the entities may have registered with the system and may have preference information saved within the system.

In an embodiment, for each environmental zone, which may comprise of each speaker area, prior to playing the next song, the system determines which of the entities will be in the environmental zone for part or all of the song. The system analyzes the music preferences for each entity likely to be in the environmental zone for that song, matches the preferences against their playlist, and determines which song would be preferred by the majority of entities near the speaker. By way of example, the system plays a song preferred by a majority of the entities in the environmental zone.

The following describes another example implementation of the invention. Entities authenticate with the system and establish their location through GPS. The system analyzes language preferences for the entities. For example, if the business has access to the entities' preference information on facebook or other social networking sites, the system analyzes this. Also, the entities may have registered with the system and may have preference information saved within the system.

In an embodiment, for each environmental zone, which may comprise of each speaker area, prior to playing an announcement, the system determines which entities will be in the environmental zone for part or all of the announcement. The system determines which translations of a message would be preferred by people in each environmental zone. The system then sends the message and the translated versions through the speaker system. Accordingly, the system may leverage automatic translation, and text to speech capabilities.

In an embodiment, one or more entities may comprise a tourist bus or some other vehicle and a language preference may be associated with the tourist bus or other vehicle. For example, knowledge of the destination of the tourist bus, country or countries of origin for the tourists on the tourist bus, or other language preference information for a tourist bus may be leveraged. Accordingly, the system may determine which translations of a message would be preferred by the tourist bus. The system may then send the message and the translated versions through the speaker system.

By way of example, a temperature control solution might practically work best for a room where the same entities are likely to stay for a longer period of time, given that constantly shifting temperature can increase costs. The system can also be used to analyze advertisements that would yield the greatest results based on preferences or social presence of the majority audience in the area. Where the environmental characteristic takes time to change, like temperature control, the system may poll people less frequently. Where cost of change or policy is a factor, the system can set parameters and ranges of acceptable options.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for automatically managing an environment for a physical zone over a period of time, the method comprising:
   receiving position coordinates from a plurality of entities;
   determining by a computer processor with non-transitory storage memory which of the entities will occupy the physical zone over a time frame, the physical zone including at least one environmental characteristic;
   accessing environmental preferences for the entities determined to occupy the physical zone for the time frame; and
   adjusting the environmental characteristic of the physical zone for the time frame based on the accessed environmental preferences for the entities;
   wherein multiple position coordinates are received from each of the entities over time; and
   wherein determining which of the entities will occupy the physical zone over the time frame further comprises extrapolating a speed and direction for the entities.

2. The method of claim 1, wherein accessed environmental preferences for a first entity are mined from one or more of a social media profile, a profile describing the first entity's environmental preferences, web content associated with the first entity, and trends based the first entity's demographic information.

3. The method of claim 1, wherein adjusting the environmental characteristic for the time frame further comprises:
weighing the accessed environmental preferences for the entities based on one or more parameters associated with the entities;
and adjusting the environmental characteristic based on the weighing.

4. The method of claim 3, wherein parameters associated with the entities comprise at least one of spending history, spending potential, past behavior, entity size, language preference, and duration of time spent in the physical zone during the time frame.

5. The method of claim 1, further comprising:
displaying one or more advertisements to the entities in the physical zone over the time frame; and
adjusting the one or more advertisements for the time frame based on the accessed environmental preferences for the entities.

6. The method of claim 5, wherein adjusting the advertisements for the time frame further comprises adjusting at least one of images, text size, subject matter, language, and discounts for the advertisements.

7. The method of claim 1, wherein the entities comprise at least one of people, groups of people, vehicles, mobile devices and animals.

8. The method of claim 1, wherein the environmental characteristic comprises one of temperature, lighting, music type, audio volume, scent, air current, humidity and language requirements.

9. The method of claim 1, wherein the received position coordinates are detected based on one or more of a global positioning satellite (GPS) location, a mobile device signal, social media information, and a radio-frequency identification (RFID) signal.

10. A system for automatically managing an environment for a physical zone over a period of time, the system comprising:
a computer with non-transitory storage memory and including a processor, the computer configured to:
receive position coordinates from a plurality of entities;
determine which of the entities will occupy the physical zone over a time frame, the physical zone including at least one environmental characteristic;
access environmental preferences for the entities determined to occupy the physical zone for the time frame; and
adjust the environmental characteristic of the physical zone for the time frame based on the accessed environmental preferences for the entities;
wherein determining which of the entities will occupy the physical zone over the time frame further comprises extrapolating a speed and direction for the entities.

11. The system of claim 10, further comprising:
wherein multiple position coordinates are received from each of the entities over time.

12. The system of claim 10, wherein accessed environmental preferences for a first entity are mined from one or more of a social media profile, a profile describing the first entity's environmental preferences, web content associated with the first entity, and trends based the first entity's demographic information.

13. The system of claim 10, wherein adjusting the environmental characteristic for the time frame further comprises:
weighing the accessed environmental preferences for the entities based on one or more parameters associated with the entities; and
adjusting the environmental characteristic based on the weighing.

14. The system of claim 13, wherein parameters associated with the entities comprise at least one of spending history, spending potential, past behavior, entity size, language preference, and duration of time spent in the physical zone during the time frame.

15. The system of claim 10, wherein the computer is further configured to:
display one or more advertisements to the entities in the physical zone over the time frame; and
adjust the one or more advertisements for the time frame based on the accessed environmental preferences for the entities.

16. The system of claim 15, wherein adjusting the advertisements for the time frame further comprises adjusting at least one of images, text size, subject matter, language, and discounts for the advertisements.

17. The system of claim 10, wherein the entities comprise at least one of people, groups of people, vehicles, mobile devices and animals.

18. The system of claim 10, wherein the environmental characteristic comprises one of temperature, lighting, music type, audio volume, scent, air current, humidity and language requirements.

19. The system of claim 10, wherein the received position coordinates are detected based on one or more of a global positioning satellite (GPS) location, a mobile device signal, social media information, and a radio-frequency identification (RFID) signal.

20. A computer program product embodied in non-transitory storage memory comprising:
computer readable program codes coupled to the non-transitory storage memory to automatically manage an environment for a physical zone over a period of time, the computer readable program codes configured to cause the program to:
receive position coordinates from a plurality of entities;
determine which of the entities will occupy the physical zone over a time frame, the physical zone including at least one environmental characteristic;
access environmental preferences for the entities determined to occupy the physical zone for the time frame; and
adjust the environmental characteristic of the physical zone for the time frame based on the accessed environmental preferences for the entities;
wherein the computer readable program code to determine which of the entities will occupy the physical zone over the time frame further comprises computer readable program code to extrapolate a speed and direction for the entities.

21. The computer program product of claim 20, further comprising:
computer readable program code to receive wherein multiple position coordinates from each of the entities over time.

22. The computer program product of claim 20, further comprising computer readable program code to mine the accessed environmental preferences for a first entity from one or more of a social media profile, a profile describing the first entity's environmental preferences, web content associated with the first entity, and trends based the first entity's demographic information.

23. The computer program product of claim 20, wherein the computer readable program code to adjust the environmental characteristic for the time frame further comprises computer readable program code to:
   weigh the accessed environmental preferences for the entities based on one or more parameters associated with the entities;
   and adjust the environmental characteristic based on the weighted environmental preferences.

24. The computer program product of claim 23, wherein parameters associated with the entities comprise at least one of spending history, spending potential, past behavior, entity size, language preference, and duration of time spent in the physical zone during the time frame.

* * * * *